July 1, 1958 C. W. JOHNSON ET AL 2,841,076
CHECK WRITING AND SIGNING MACHINE
Filed Feb. 15, 1955 8 Sheets-Sheet 1

July 1, 1958 C. W. JOHNSON ET AL 2,841,076
CHECK WRITING AND SIGNING MACHINE
Filed Feb. 15, 1955 8 Sheets-Sheet 4

Inventors:
Clarence W. Johnson
John Kreidich
By Ahlberg, Kupper & Gradolph
Attorneys.

July 1, 1958  C. W. JOHNSON ET AL  2,841,076
CHECK WRITING AND SIGNING MACHINE
Filed Feb. 15, 1955  8 Sheets-Sheet 5

Fig. 10.

Inventors:
Clarence W. Johnson
John Kreidich
By Ahlberg, Kupper, & Bradolph
Attorneys.

July 1, 1958   C. W. JOHNSON ET AL   2,841,076
CHECK WRITING AND SIGNING MACHINE
Filed Feb. 15, 1955   8 Sheets-Sheet 6

Inventors:
Clarence W. Johnson
John Kreidich
By Ahlberg, Kupper & Gradolph
Attorneys.

United States Patent Office 2,841,076
Patented July 1, 1958

2,841,076

CHECK WRITING AND SIGNING MACHINE

Clarence W. Johnson, Barrington, and John Kreidich, Chicago, Ill., assignors to The Hedman Company, Chicago, Ill., a corporation of Delaware Application February 15, 1955, Serial No. 488,356

16 Claims. (Cl. 101—91)

The present invention relates to machines for writing and signing checks. Such machines promote greater efficiency in preparing checks, while providing worthwhile protection against alteration of the checks.

To minimize temptations to defraud, the practice in many firms has been to divide the procedure of preparing checks between two different people, one of whom fills in the amount of each check and gives it to the other who adds the signature. Hence, many check writing machines have been sold and used to fill in the amounts of checks. Ordinarily the checks are signed by hand or by other machines provided for this purpose.

One object of the invention is to provide in an extremely economical manner for more efficient production of checks by means of a coupled check writing and signature machine which imprints both the amount and the signature along with other data on individual checks, while at the same time providing a large measure of protection against attempts to produce unauthorized checks on the machine without detection.

Another object is to provide an improved check signing machine having novel means for discouraging attempts to sign checks in the machine without detection, thus making feasible use of the machine automatically to receive and sign checks released from a conventional check writing machine which imprints the amount on each check and serves as a control for initiating operation of the check signing machine in timed relation to the operating cycle of the check writing machine.

A further object is to provide a check signing machine, as recited in the previous objects, having improved check counting means which provides assurance against a false count when the machine is put through an operating cycle without a check being fed into the machine.

Another object is to provide an improved check signing machine having novel means of a highly simplified construction for effectively ejecting signed checks from the machine. A related object is to provide an improved check signing machine, equipped with the novel ejector recited, with improved check feeding means which is effectively released from each check in timed relation to operation of the machine to permit discharge of the signed check from the machine by the ejector.

An additional object of the invention is to provide an improved check signing machine having highly simplified, yet efficient, means for feeding checks into the machine and for imprinting the data and signature on each check.

Other objects and advantages will become apparent from the following description of the form of the invention illustrated in the drawings, in which.

Referring to the drawings in greater detail, the coupled check writing and signing machine embodying the illustrated form of the invention (Fig. 1) is capable of imprinting the amount, signature, and date on individual checks in one continuous sequence of operations which automatically follow actuation of a single manual control 10. The control 10 is a standard component of a conventional, electrically energized check writing or amount printing machine 12 mounted on one end of an elongated base 14 and forming the first check imprinting station or component of the complete machine.

Blank checks are inserted in the check writing machine 12 (Fig. 1) between a platen 16 and a printing head 18. The operator enters the amount of the check on the keyboard 20 and presses the manual control 10. This procedure is standard for check writing machines of this type.

Figure 1:
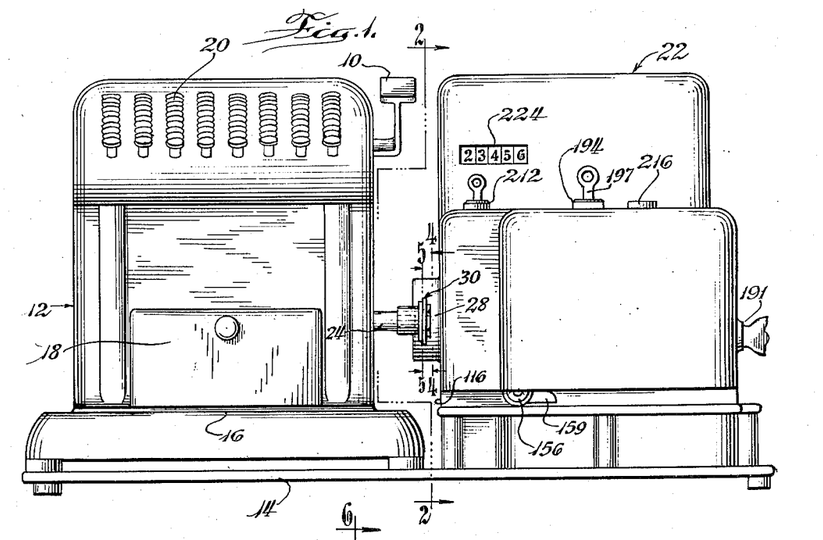
Figure 1 is a front view of a coupled check writing and signature machine incorporating the invention.

The check writing component 12 of the complete machine then imprints the amount on the check and starts a check signing component 22 of the machine mounted on the other end of the base 14 to automatically pick up each check after it is written and add the signature. Although the signature component 22 can be used separately from the entire machine, it has several novel features which are utilized to greater advantage in conjunction with the check writing component 12, which serves as an automatic control and check supply for the signature component.

Automatic operation of the signature machine 22 upon completion of each operating cycle of the check writing machine 12 is effected by very simple, yet reliable, interconnecting controls. The operating mechanism of the check writing machine 12 includes a transverse horizontal main shaft 24 which protrudes from the right-hand side of this machine toward the signature machine 22. During each operating cycle of the check writing machine the shaft 24 is rocked through an angle of approximately 150 degrees.

This movement of the shaft 24 is used to initiate operation of the signature machine 22 as the operating cycle of the check writing machine nears completion. For this purpose a starting switch 28 is mounted on the side of the check signing machine 22 adjacent the check writing machine 12 for operation by an extremely simple switch actuating linkage 30 fixed to the outer end of the shaft 24.

Figure 4:
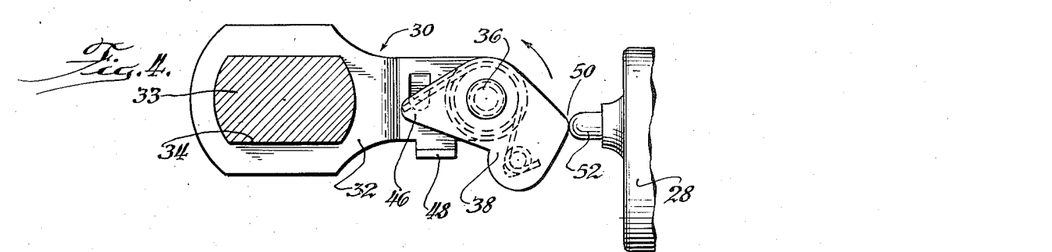
Fig. 4 is a fragmentary sectional view on an enlarged scale, taken along the line 4—4 of Fig. 1.
Figure 5:
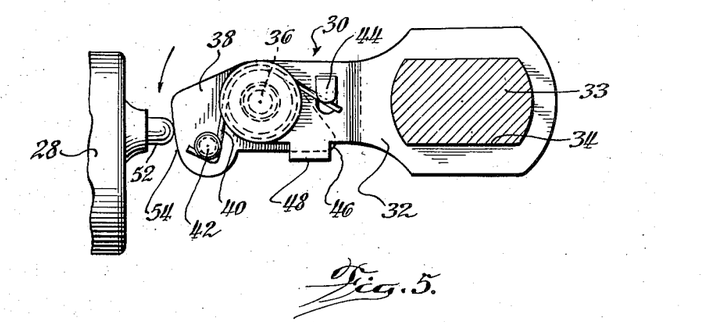
Fig. 5 is a fragmentary sectional view, taken along the line 5—5 of Fig. 1.

As shown in Figs. 4 and 5, the switch actuator 30 comprises an elongated sheet metal arm 32, defining an elongated slot 34 in one end. The slotted end of the arm 32 is fixed to the projecting end of the shaft 24 by means of a simple adapter 33, Fig. 1. When the shaft 24 is in its normal position, the arm 32 extends rearwardly and downwardly from the shaft towards the starting switch 28. A transverse pivot 36 (Figs. 4 and 5) in the free end of the arm 32, extends through the upper medial portion of a toggle extension 38 of the arm. The projecting end of the toggle extension 38 is biased upwardly by a spring 40 coiled around the pivot 36 and anchored at opposite ends respectively to a stud 42 on the extension and to an ear 44 struck from the arm 32. Upward movement of the projecting end of the extension 38 is limited, however, by engagement of a heel 46 on the end of the extension adjacent the shaft 24 with a lug 48 bent laterally from the lower edge of the arm 32 (Fig. 5).

Operation of the check writing machine 12 first rotates the shaft 24 in a direction to swing the switch actuator 30 upwardly (counterclockwise as indicated by the arrow in Fig. 4). This causes a nose 50 on the outer end of the extension 38 to engage the rounded end of a forwardly projecting control plunger 52 of the switch 28. The spring 40 yields, allowing the projecting end of the member 38 to swing downwardly on the arm 32 to pass the plunger 52 without actuating the switch. After passing the plunger 52, the extension 38 snaps back into its normal position.

On the return stroke of the switch actuator 30 (Fig. 5) a cam surface 54 on the lower outer end of the toggle extension 38 engages the plunger 52. Swinging movement of the extension 38 on the arm 32 is prevented by engagement of the heel 46 with the lug 48. Hence, the full length of the switch actuator 30 operates to move the plunger 52 inwardly and close the switch 28 as the actuator continues downward.

Figure 2:
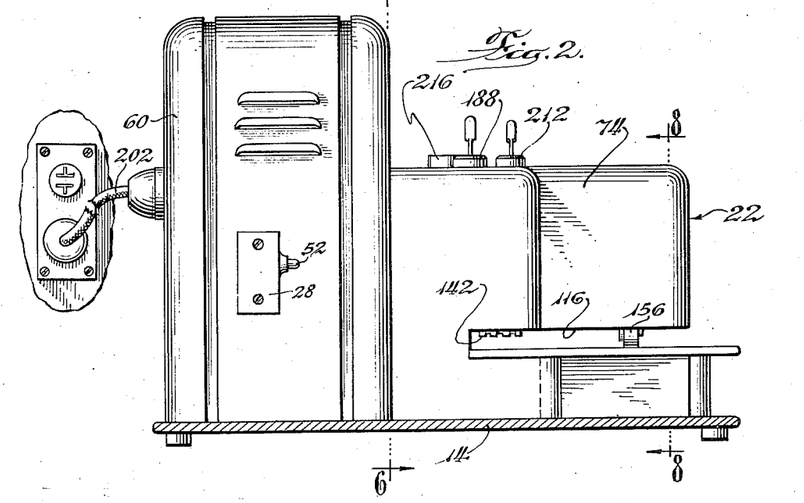
Fig. 2 is a vertical sectional view, taken generally along the line 2—2 of Fig. 1.

The switch 28 acts through a control circuit, which will presently be described, to energize an electric motor 56 (indicated diagrammatically in Fig. 3), forming a part of a conventional single revolution drive mechanism 58 (indicated diagrammatically in Fig. 7) mounted in a housing 60 (Fig. 2).

The output shaft 62 of the drive mechanism 58 (Fig. 7) is connected by a disc 64 and a pair of pins 66 with a pulley 68 fixed on the rear end of a main shaft 70 of the signature machine, which protrudes through a supporting journal 72 in the casing or housing 74 of the machine. The other end of the shaft bears in a journal 76 in the forward vertical wall 78 of the casing (Fig. 11).

Figure 9:
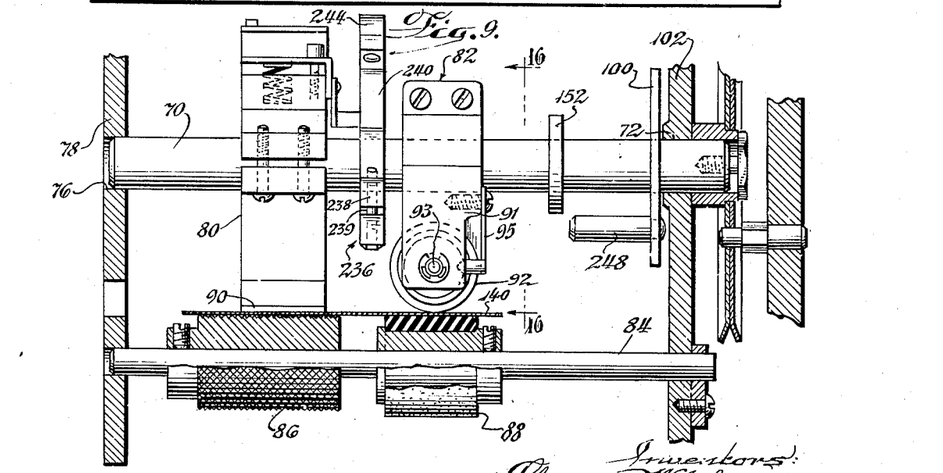
Fig. 9 is a fragmentary vertical sectional view, taken generally along the line 9—9 of Fig. 8, but showing the printing assembly completing a check signing cycle.
Figure 11:
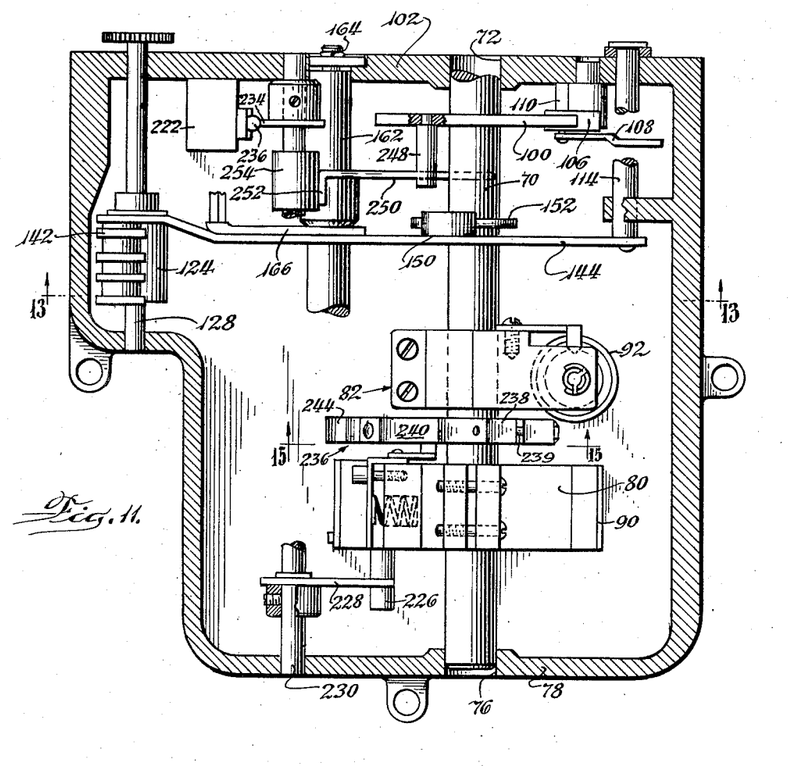
Fig. 11 is a simplified horizontal sectional view, taken generally along the line 11—11 of Fig. 8.

Between the journals 72 and 76 the shaft 70 forms a part of a rotary printing assembly including a signature sector 80 mounted on the forward end of the shaft and a dating assembly 82 mounted on the shaft in rearwardly spaced relation to the signature sector (Figs. 9 and 11).

A support shaft 84 (Fig. 9) mounted in the casing 74 in underlying parallel relation to the main shaft 70 supports two platen rollers 86, 88 below the printing sector 80 and dating assembly 82, respectively.

The signature sector 80 carries a detachable logotype 90 adapted to coact with the platen roller 86 to imprint the desired signature on a check passing between the logotype and the roller. Mating protuberances and recesses on the logotype 90 and platen 86 scarify the check and imprint the signature in an unalterable manner.

Figure 16:
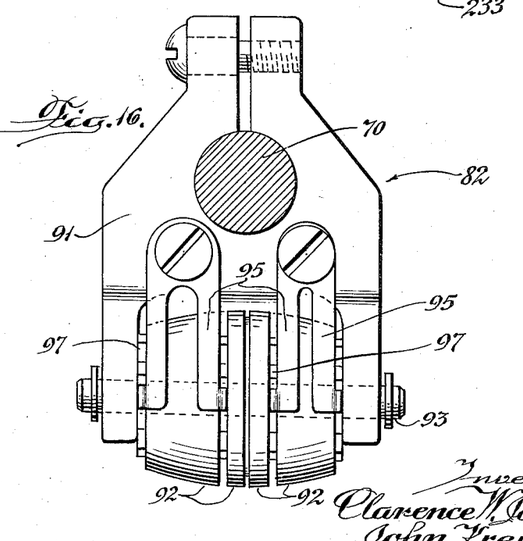
Fig. 16 is an enlarged fragmentary view, taken along the line 16—16 of Fig. 9.

The dating assembly 82 comprises an arm 91 (Figs. 9 and 16) clamped at one end to the shaft 70 and extending radially from the shaft. A barrel shaped assembly of four printing rollers 92 is supported in the bifurcated outer end of the arm 91 by a transverse pin or axle 93 in the arm perpendicular to the shaft 70. The two end rollers print the month and year respectively; the two central rollers print the day of the month. The peripheries of all four rollers are tangent to an arc concentric with the shaft 70. Four spring pawls 95 fixed to the arm 91 engage ratchet wheels 97 fixed to the respective rollers 92 yieldably to retain the latter at the desired date setting.

The signature sector 80 and the dating assembly 82 can be adjusted along and around the shaft 70 to imprint the signature and date in the desired positions on the checks used.

Two pairs of conventional inking rollers 96, 98 are yieldably mounted in the housing 74 above and to the left of the shaft 70 (Figs. 8 and 10) to apply ink to the logotype 90 and the dating assembly 82 at the beginning of each printing cycle.

Figure 13:
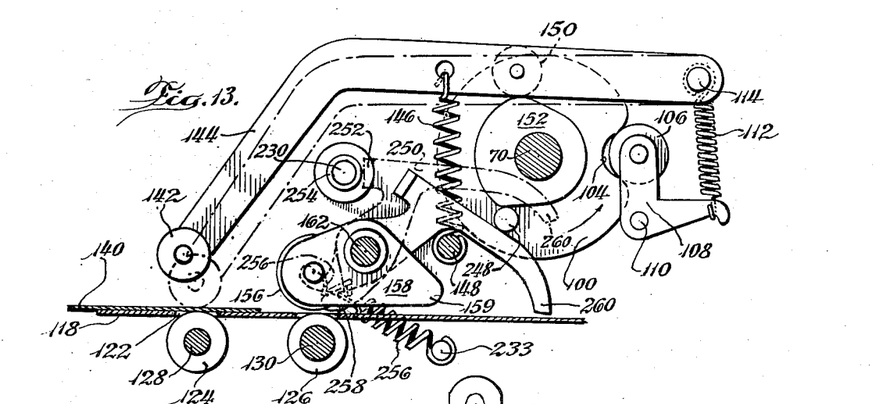
Fig. 13 is a simplified sectional view, taken generally along the line 13—13 of Fig. 11.

For each cycle of operation, the shaft 70 is rotated counterclockwise from a starting position (Figs. 8 and 13) through one complete turn by the single revolution drive mechanism 58 previously mentioned. Proper location of the shaft 70 in starting position between successive cycles of operation is assured by simplified detent structure comprising a disc-like cam 100 mounted on the shaft 70 adjacent the rear wall 102 of the housing 74. A radial indentation 104 in the periphery of the cam is circumferentially located on the cam 100 to receive, when the shaft 70 is in starting position, a follower roller 106 journaled on one end of a bell crank 108 swingably mounted on a fixed pivot 110 (Fig. 13). A tension spring 112 connected between a horizontal shaft 114 in the housing 74 and the other end of the bell crank 108, holds the roller 106 in the cam indentation 104 yieldably to retain the shaft 70 in starting position between operating cycles.

Checks are fed over the platen rollers 86, 88, by improved check feeding mechanisms which provide protection against the simultaneous feeding of more than one check through the check printing zone.

Figure 8:
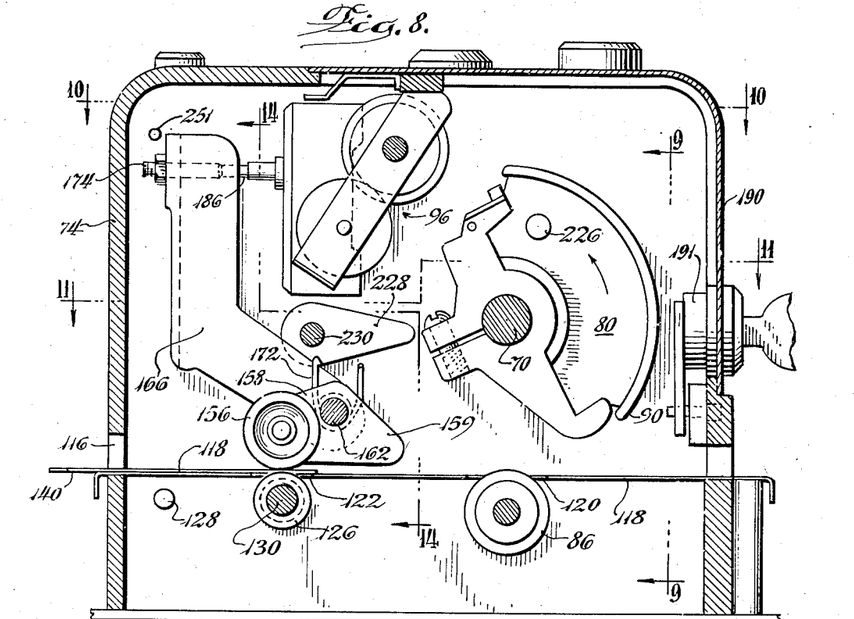
Fig. 8 is a simplified vertical sectional view, taken along the line 8—8 of Fig. 2.

Upon insertion of a check into printing position below the printing head 18 of the check writing machine 12, one end of the check projects beyond the platen 16 into a slot 116 which extends horizontally from left to right through the housing 74 of the signature machine (Figs. 1 and 8). A horizontal plate 118 (Fig. 8) at the lower side of the slot 116 extends all the way across the housing 74 passing immediately over the platen rollers 86, 88. Rectangular openings 120 in the plate 118 (Fig. 8) expose the platen rollers 86, 88 for cooperation with the overlying printing assembly.

Figure 10:
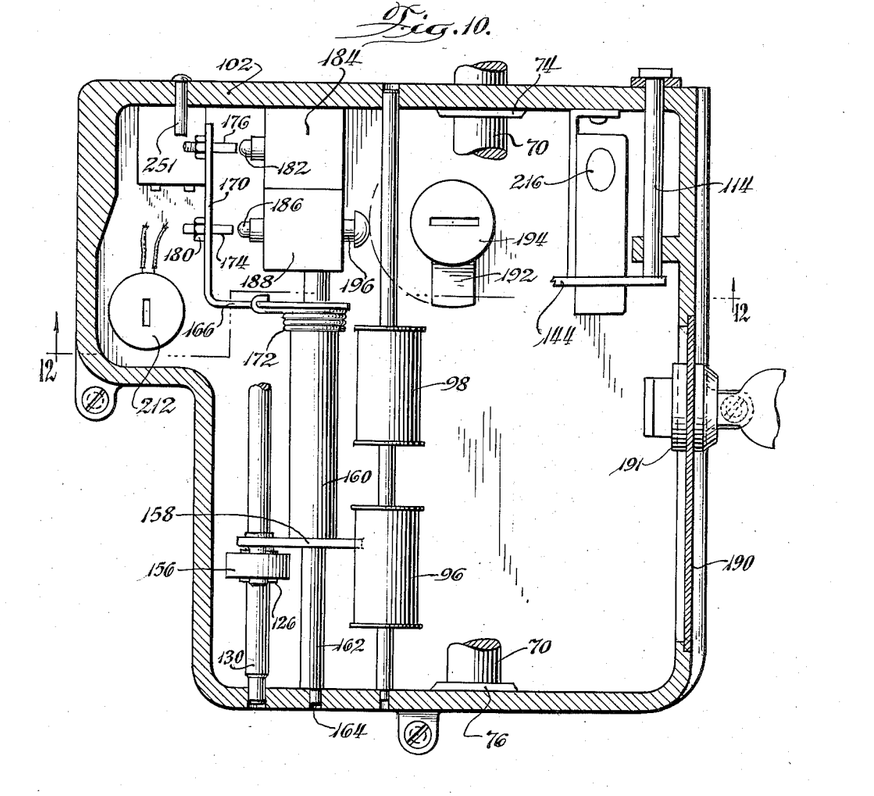
Fig. 10 is a simplified horizontal sectional view, taken generally along the line 10—10 of Fig. 8.

Similar openings 122 in the portion of the plate 118 near the left-hand side of the housing 74 (Fig. 8) expose an underlying check feed wheel 124 and a check selector wheel 126 (Figs. 10, 11, and 13). The wheels 124, 126 are mounted respectively on two parallel shafts 128, 130 journaled at opposite ends in the housing 74 in parallel relation to the main shaft 70. The check feed wheel 124 is located near the left-hand end of the slot 116 (Fig. 13). The selector wheel 126 is located forwardly and somewhat to the right of the wheel 124.

Figure 6:
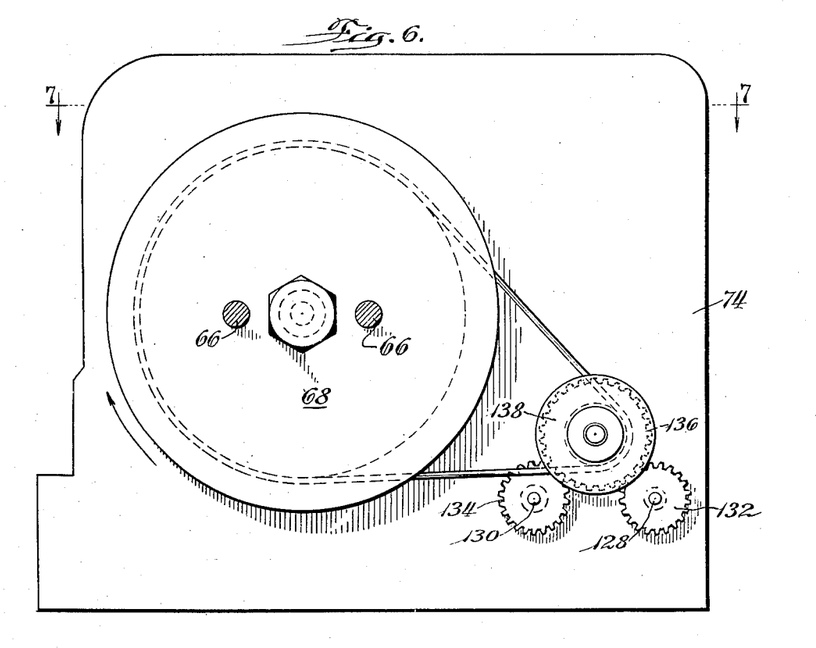
Fig. 6 is a simplified vertical sectional view, taken along the line 6—6 of Fig. 2.
Figure 7:
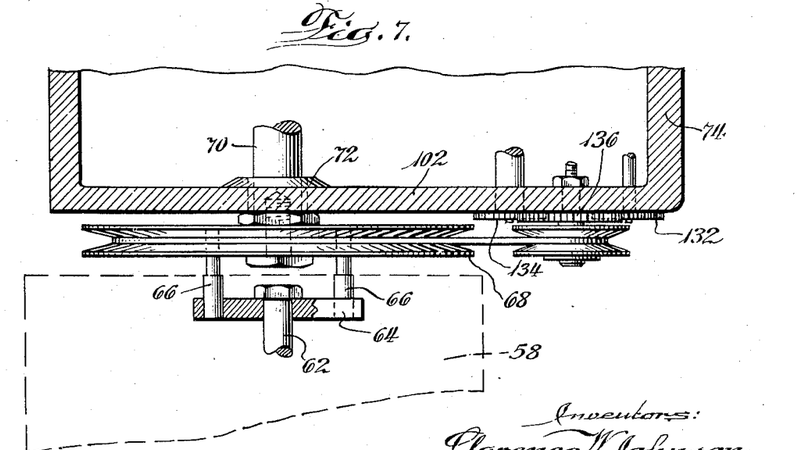
Fig. 7 is a fragmentary horizontal sectional view, taken along the line 7—7 of Fig. 6.

Both shafts 128, 130 are rotated in the counterclockwise direction, as viewed from the rear ends (Fig. 6) by gear wheels 132, 134 fixed to the extreme rear ends of the shafts, which protrude through the housing wall 102 (Fig. 7). Both gears 132, 134 mesh with a common driving gear 136 rotated by a small pulley 138 belt driven from the previously mentioned pulley 68, which has a much larger diameter.

As previously stated, one end of a check inserted into printing position in the check writing assembly 12 projects into the signature machine casing slot 116. Actually, the signature machine end of a check 140 inserted into the checkwriting assembly extends across the signature assembly plate 118 between the check feed wheel 124 and an overlying roller 142 initially held a substantial distance above the feed wheel, Fig. 13.

As shown in Figs. 11 and 13, the roller 142 is journaled on the free end of an idler arm 144 which extends upwardly from the roller and crosses the main shaft 70 to the previously mentioned support shaft 114 for the arm, mounted on the opposite (right-hand) side of the housing 74. The idler arm 144 is biased downwardly by a tension spring 146 connected between a medial portion of the arm and an underlying shaft 148 mounted in the housing in parallel relation to the main shaft 70.

When the main shaft 70 is in starting position (Fig. 13) the idler arm 144 is supported in a raised position by a cam follower roller 150 journaled on the arm for engagement with a single lobed cam 152 fixed to the adjacent portion of the main shaft 70. Counterclockwise rotation of the main shaft 70 away from starting position (Fig. 13) swings the single lobe of the cam 152, which has a substantial arcuate extent about the shaft 70, away from the follower roller 150, thus allowing the idler arm 144 to lower the roller 142 to engage one end of a check 140 projecting from the check writing machine 12 into overlying relation to the check feed wheel 124. The operative position of the idler arm 144 and roller 142 is shown in phantom in Fig. 13.

A check 140 picked up between the feed wheel 124 and the roller 142 is moved from left to right (Figs. 8 and 13) over the selector wheel 126.

The check selector wheel 126 opposes improved means for sensing the presence of one or more checks on the wheel and distinguishing in its response between the thickness of a single check and that of two or more checks on the wheel.

The check sensing means comprises a roller 156 journaled on the left end of a rocker member 158 in immediately overlying relation to the roller 126.

The right hand end of the rocker 158, Fig. 13, forms a heel 159 extending into the immediate vicinity of the printing zone below the signature sector 80 in closely spaced relation to the plate 118. The presence of the rocker heel 159 in this relation to the printing zone is effective to block attempts to sign a check in the machine without detection by rolling up the check and feeding it into the printing zone from a rolled position between the roller 156 and the printing zone. In this manner the rocker 158 complements other features of the signature machine to be described presently, which provide assurance against improper signing of checks.

Figure 14:
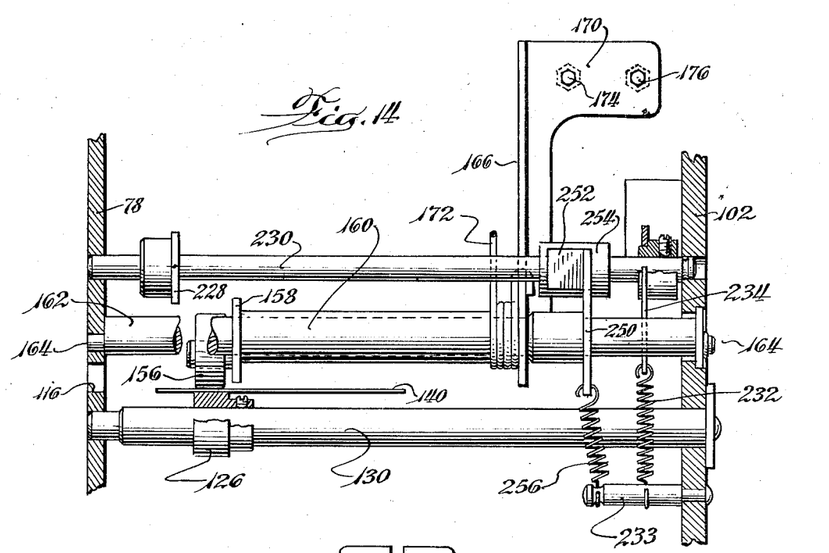
Fig. 14 is a simplified fragmentary sectional view, taken generally along the line 14—14 of Fig. 8.

The upper central portion of the rocker member 158 is fixed to the forward end of a sleeve 160 journaled on a support shaft 162 extending across the housing 74 in parallel relation to the main shaft 70. Opposite ends of the shaft 162 are supported by eccentric pivots 164 on the shaft journaled in the front and rear vertical walls of the housing 74 (Figs. 10 and 14). Normally the shaft 162 is rotated to a position which lowers the sleeve 160 and rocker 158 sufficiently to engage the roller 156 with the underlying check selector wheel 126.

The end of the sleeve 160 opposite the rocker member 158 is connected to the lower end of an operating arm 166 (Figs. 8 and 14). Formed of sheet metal, the operating arm 166 extends to the left and upwardly Fig. 8). A horizontal ear 170 integral with the upper end of the arm 166 extends rearwardly in the upper left-hand portion of the housing 74 (Figs. 10 and 14).

The arm 166 is biased to swing to the left (Figs. 8 and 10) by one end of a spring 172 coiled around the sleeve 160 and anchored to adjacent structure within the housing 74.

The laterally extending ear 170 carries two horizontally spaced actuators 174, 176. Structurally, the actuator 174, which is similar to the actuator 176, comprises an adjustable stud (also denoted by the numeral 174) threaded in the ear 170 to protrude horizontally from the right-hand side of the ear (Fig. 10). After adjustment, the stud 174 is fixed in place by a lock nut 180.

The rearmost switch operator 176 opposes the operating stem 182 of a normally open microswitch 184 mounted in the rear housing wall 162. The switch 184, called the "no-check" switch, forms a part of an electrical check counting circuit to be described later. The "no-check" switch 184 is closed upon movement of the arm supported switch actuator 176 from its normal position to the right (Fig. 10) through a first predetermined distance, the significance of which will be explained presently. The switch 184 is self-closing upon return movement of the actuator 176 to its normal position.

The switch actuator 174 opposes the operating stem 186 of a normally closed microswitch 188, called the "two-check" switch. This switch is opened by movement of the operator 174 to the right (Fig. 10) through a distance equal to or exceeding substantially twice the movement of the ear 170 required to close the "no-check" switch 184.

The two-check switch 188 is not self-closing and therefore remains open after the actuator 174 returns to normal position. The switch 188 is contained within the housing 74, which is closed by a cover 190 locked on the housing 74 by a key operated latch 191 (Figs. 8 and 10). To close the switch an arm 192 in the casing 74 is swung by a key operated locking device 194 against a resetting stem 196 protruding from the right-hand side of the switch (Fig. 10). Ordinarily the "executive" key 197 (Fig. 1) for operating the switch resetting lock 194 is kept in the custody of a responsible person other than the usual operator of the machine.

Figure 3:
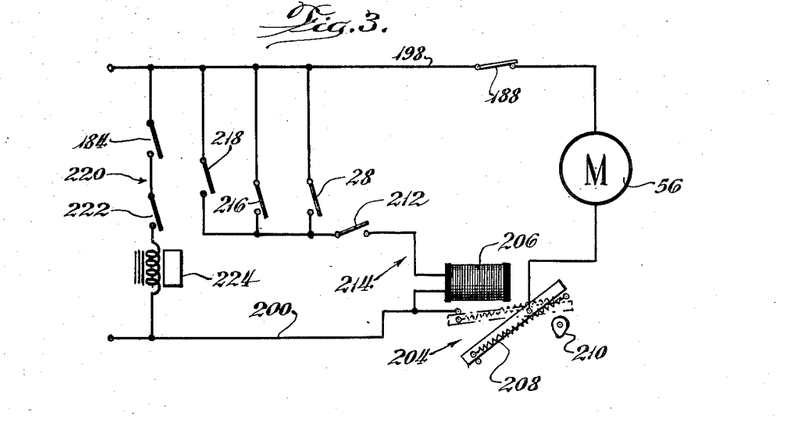
Fig. 3 is a simplified diagrammatic layout of the electrical controls used with the checks signing component of the machine.

The two-check switch 188 forms a part of the electrical control circuit for the check writing machine shown in simplified diagrammatic form in Fig. 3. Before describing this circuit, a further word on the mechanical operation of the switches 184 and 188 is in order.

When the eccentric rocker support shaft 162 is rotated to normal position, the roller 156 is lowered, as previously explained, to engage the second check selector wheel 126. Engagement of the roller 156 with the selector wheel 126 locates the switch operating arm 166 in a starting position in which the no-check switch 184 is open and the two-check switch 188 is closed.

The feeding of a single check between the roller 156 and the selector wheel 126 displaces the roller upwardly, causing clockwise rotation of the rocker 158 and the arm 166 (Fig. 8), producing movement of the ear 170 sufficient to close the no-check switch 184 without opening the two-check switch 188.

If two or more checks are fed simultaneously between the roller 156 and the selector wheel 126, the roller is displaced upwardly a greater distance, causing sufficient movement of the ear 170 to the right (Fig. 10) to open the two-check switch 188.

The function of the two-check switch 188, in preventing the signing of two or more checks simultaneously by the printing sector 80 through either inadvertence or fraudulent intent, will be more clear from the diagrammatic illustration of the electrical controls for the machine, shown in Fig. 3.

The normally closed switch 188 is connected in series with the driving motor 56 between two power leads 198 and 200. These two lines together form the electrical power cord 202 for the machine (Fig. 2). Starting and stopping of the motor 56 is ordinarily effected by a main control switch 204 also connected in series with the motor. The switch 204 used for this purpose is of conventional construction. As shown diagrammatically in Fig. 3, its armature is moved to switch closing position by a coacting solenoid 206, where it is held by suitable retaining means, illustrated as an over-center spring 208. The switch is mechanically opened by suitable switch operating means on the drive mechanism 58 as the machine 22 completes each cycle of operation. This mechanical switch opening means is represented in Fig. 3 by a cam 210.

To prevent unauthorized use of the machine, a key controlled lock switch 212 mounted on the casing 74 (Fig. 1) is connected in series with the switch solenoid 206, which is energized through a separate circuit 214 between the two power leads 198, 200. Upon closing of the lock switch 212, the circuit 214 through the solenoid 206 may be completed through any one of three parallel switches 28, 216, and 218. The switch 28 is the previously mentioned starting switch which is automatically actuated by the switch actuator 30 on the check writing machine 12. The switch 216 is a hand operated switch on top of the casing 74, which provides for convenient manual control of the signature machine. The switch 218 is a conventional foot operated switch, illustrated diagrammatically in this figure, which can be used with the signature machine 22 to control the latter separately from the check writing machine 12.

In normal operation, the starting switch 28 is closed by operation of the check writing machine 12. This closes the motor switch 204 to drive the signature machine through one cycle of operation near the end of which the starting switch 204 is mechanically opened.

In the event two or more checks are fed simultaneously between the roller 156 and the check selector wheel 126, the two-check switch 188 is opened to deenergize the motor 56 and interrupt operation of the machine before signing of the checks is completed. Moreover, the machine cannot be restarted without again closing the switch 188, which requires the separate key 197. Ordinarily, the operator would have to call the custodian of this "executive key" to clear the machine. The effect this would have in discouraging attempts to sign two checks at once without detection will be readily appreciated.

The "no-check" switch 184 is connected in series with a check counter circuit 220 (Fig. 3) between the power leads 198, 200. As indicated diagrammatically, the circuit 220 includes, in series with the "no-check" switch 184, a counter switch 222 and a conventional electrically operated counter device 224 capable of increasing an indicated count by one each time the counter is energized. The counter switch 222 is closed once during each revolution of the signature sector 80, by structure which will be more fully described later. The indicator portion of the counter 224 is shown in Fig. 1.

To complete the circuit 220 through the counter 224 it is necessary that the no-check switch 184 be closed when the counter switch 222 is closed. Since closure of the no-check switch 184 requires the presence of a check between the selector wheel 126 and the roller 156, the counter 224 will not operate to give a false count in the event the machine is run through an operating cycle without a check being fed to the printing zone.

The actuating structure for the counter switch 222 comprises a forwardly extending stud 226 (Figs. 8 and 11) on the printing sector 80 which engages a projecting arm 228 (Figs. 8, 11, and 14), fixed to a shaft 230 journaled in the housing 74 in parallel relation to the main shaft 70. As shown, the switch shaft 230 is located upwardly and somewhat to the left (Fig. 8) of the rocker support shaft 162. The signature sector stud 226 swings the arm 228 and the shaft 230 in the clockwise direction (Fig. 8) against the biasing force of a tension spring 232 (Fig. 12) anchored to a stud 233 on the casing wall 102 and connected to the projecting end of an arm 234 fixed to the opposite end of the shaft (Fig. 14).

Figure 12:
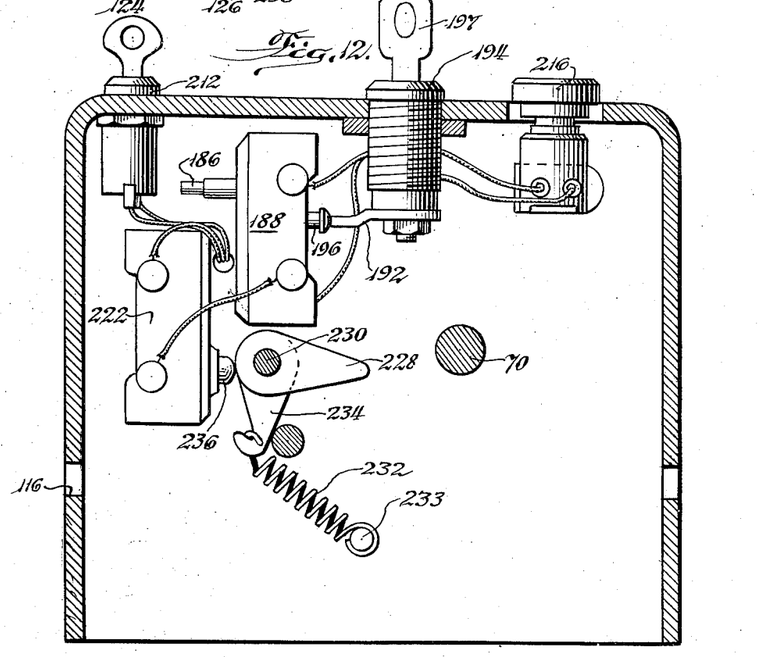
Fig. 12 is a simplified vertical sectional view, taken generally along the broken line 12—12 of Fig. 10.

As shown best in Fig. 12, the arm 234 engages and actuates the protruding stem 236 of the counter switch 222 fixed to the rear casing wall 102. The counter switch actuating linkage thus provided closes the counter switch 222 for a brief period of time shortly after the signature sector 80 starts to rotate through an operating cycle.

Figure 15:
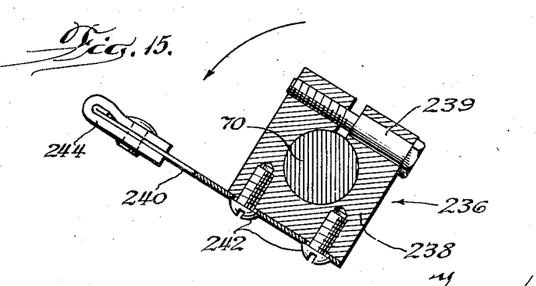
Fig. 15 is a fragmentary sectional view, taken along the line 15—15 of Fig. 11.

Each check signed in the machine is ejected by an extremely simple ejector 236 (Figs. 9 and 15) clamped to the shaft 70 between the signature sector 80 and the date printing assembly 82. As shown best in Fig. 15, the ejector 236 comprises a square block 238 clamped by a screw 239 to the shaft 70. One end of a straight flexible spring member 240 is adjustably fixed to one side of the block 238 by screws 242. The spring member 240, thus supported, extends radially outwardly from the shaft 70 with a slight negative rake with respect to the normal direction of rotary movement of the shaft 70, indicated by the arrow in Fig. 15. The free end of the spring member 240 is bent back on itself and embraced by a nonskid check pick-up 244 made from rubber or similar material.

The radial distance from the axis of the shaft 70 to the extreme outer end of the pickup 244 when the spring member 240 is unflexed, is somewhat greater than the distance between the shaft axis and the underlying check support plate 118. Put another way, the normal radius between the outer tip of the pickup 244 and the main shaft axis is somewhat greater than the effective radius of the logotype 90. Hence, as the shaft 70 rotates, it swings the flexible member 240 downwardly across the plate 118. The pickup 244 engages the check being signed, and flexes the member 240 rearwardly with respect to the direction of rotation of the shaft and inwardly toward the axis of the shaft. This stores energy in the member 240 which ejects the check as the pickup 244 is swung clear of the plate 118.

In order that ejection of the check may follow shortly after completion of the check signing operation, the angular position of the ejector 236 on the shaft 70 is such that the pickup element 244 normally follows somewhat behind the trailing end of the logotype 90.

By the time ejection of the check occurs, the check is fully released by the check feeding means. The roller 142 is lifted away from the check feed wheel 124 by engagement of the lobe of the cam 152 with the follower 150 on the roller support arm 144. The roller 156 is lifted upwardly from the check selector wheel 126 by clockwise rotation (Fig. 13) of the shaft 162 to raise the supporting rocker 158 for the roller.

Rotation of the shaft 162 for this purpose is effected by means of an arm 250 fixed to the rear end of the shaft 162, Figs. 11 and 14, and projecting to the right, Fig. 13, for engagement by a forwardly projecting stud 248 on the cam 100 as the main shaft 70 approaches the end of its rotary cycle of movement. The stud 248 rotates the arm 250 approximately 30 degrees from the position illustrated in phantom to the position shown in solid lines in Fig. 13 and holds the arm in displaced position after the main shaft 70 has returned to its starting position upon completion of an operating cycle.

To prevent swinging of the rocker 158 too far in the counterclockwise direction, Fig. 13, which would defeat the purpose of raising the rocker support shaft 162 as a means of lifting the roller 156, an inwardly projecting stud 251, Figs. 8 and 10, is fixed to the rear wall 102 of the housing 74 in position to limit movement to the left of the ear 170 on the arm 166 connected through the sleeve 160 to the rocker.

In this manner, the rocker 158 and the roller 156 are lifted and held in raised position to permit unrestrained ejection of each check signed. Moreover, the elevated position of the roller 156 between successive operating cycles of the check signing machine may be of advantage in inserting extra long checks into the check writing machine 12 in that the ends of a check may project freely into overlying relation to the check selector wheel 126 before the check signing machine is started.

The initial movement of the shaft 70 in the counterclockwise direction, Fig. 13, at the beginning of each operating cycle of the check signing machine carries the stud 248 beyond the end of the arm 250. A tension spring 256 connected between a downward extension 258 on the arm 250 and the stud 233 immediately rocks the arm and the shaft 162 in a counterclockwise direction to lower the rocker 158 and the roller 156 into operative position.

Actually, the return of the rocker 158 and the roller 156 to operative position is more gradual than abrupt, thus minimizing shock to the linkage system. As shown in Fig. 13, the projecting right hand end of the arm 250 is extended outwardly and turned downwardly 260 to allow substantial counterclockwise return movement of the arm and shaft 162 before the stud 248 clears the projecting end of the arm.

Termination of counterclockwise return movement of the arm 250 is cushioned by engagement of an abutment 252 formed on the left hand edge of the arm with a rubber bumper 254 on the switch shaft 230.

While we have shown and described a preferred embodiment of our invention, it will be apparent that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. A check writing and signing machine comprising, in combination, a base, a check writing assembly mounted on said base and including a shaft movable during each operating cycle of the assembly, a switch actuator connected to said shaft, a check signing assembly mounted on said base adjacent said check writing assembly and including a check imprinting assembly, electrical driving means connected to said imprinting assembly, a starting switch for said electrical driving means mounted for operation by said switch actuator, means for feeding checks through a predetermined path into position to be signed by said imprinting assembly, a roller adjacent one side of said path, roller opposing means mounted on the other side of said path in alignment with the roller, rocker means supporting said roller and mounted for swinging the roller into and out of engagement with said roller opposing means about an axis spaced from the center of the roller, a second switch actuator connected for movement by said rocker, a disabling switch mounted in association with said second switch actuator for operation thereby upon swinging movement of said rocker by displacement of said roller away from said roller opposing means by a distance corresponding to the thickness of two or more checks therebetween, electrical circuit means interconnected between said disabling switch and said imprinting assembly driving means for terminating operation of the latter upon actuation of said disabling switch, said disabling switch including means for resetting the disabling switch after operation thereof by said second switch actuator, and means including a lock coacting with said disabling switch to preclude resetting of the disabling switch while said lock is in locked position.

2. A coupled machine for imprinting the amount and signing individual checks in one continuous sequence of imprinting operations which automatically follow one after the other, comprising, in combination, a base, a check writing assembly mounted on said base and including a shaft swingable back and forth through a predetermined angle of rotary movement as an incident to each operating cycle thereof, an electrically operated check signing assembly mounted on said base, to receive checks released by said check writing assembly, said check signing assembly including a starting switch mounted on a side thereof adjacent said check writing assembly, said starting switch including an operator thereon, and a switch actuator on said writing assembly shaft for operating said starting switch; said actuator including, an arm fixed to said shaft, a toggle extension on said arm dimensioned to engage said switch operator as an incident to movement of said shaft, means supporting said extension on said arm for swinging movement thereon to an inoperative position upon engagement of said extension with said switch operator as an incident to movement of said arm in one direction, and means on said arm and said extension coacting to hold said extension in an operative position on said arm upon rotary movement of said shaft in the opposite direction effectively to actuate said switch operator by said extension.

3. In a machine for writing and signing individual checks in one continuous sequence of imprinting operations which follow automatically one after the other, the combination of a base, a check writing assembly mounted on said base and including a shaft rocked back and forth through a predetermined angle of movement during each operating cycle of the assembly, a check signing assembly mounted on said base to receive checks released from said writing assembly, a starting switch for said check signing assembly, a toggle switch actuator mounted on said shaft for operating said starting switch as an incident to each operating cycle of the shaft, said toggle switch actuator having pivot means therein providing for scissoring of the actuator to an inoperative position as an incident to movement of the shaft in one direction, and means on said toggle switch actuator for preventing scissoring thereof upon engagement of the switch actuator with the switch as an incident to movement of the shaft in the opposite direction to render said actuator effective to operate the switch.

4. In a check imprinting machine, the combination of a rocker mounted for swinging movement about a support axis, a roller journaled on said rocker in radially spaced relation to the support axis thereof, a check selector wheel positioned for engagement by said roller upon swinging movement of said rocker in one direction to a starting position, said selector wheel and said roller serving to swing said rocker in the opposite direction upon movement of one or more checks between the wheel and roller, a first switch actuator connected with said rocker for movement thereby, a first switch mounted in association with said first switch actuator for operation thereby upon displacement of said rocker from starting position to a degree corresponding to the presence of a single check between said wheel and said roller, electrical counter means connected with said first switch for activation upon operation of the latter by said actuator therefor, a second switch actuator connected with said rocker for movement thereby, a second switch mounted in association with said second switch actuator for operation thereby upon displacement of said rocker from starting position to a degree corresponding to the presence of two or more checks between said wheel and said roller, machine control means connected with said second switch for disabling the machine upon operation of the second switch by said actuator therefor, said second switch including means for resetting the switch after operation thereof by said second switch actuator, and means including a lock coacting with said second switch to preclude resetting of the second switch while the lock is in locked position.

5. In a check signing machine, the combination of a movable check imprinting assembly, driving means connected to said imprinting assembly, means for feeding checks through a predetermined path into position to be signed by said imprinting assembly, a roller adjacent one side of said path, roller opposing means mounted on the other side of said path in alignment with the roller, rocker means supporting said roller and mounted for swinging the roller into and out of engagement with said roller opposing means about an axis spaced from the center of the roller, a disabling switch, a switch actuator connected for movement by said rocker means, said switch actuator extending into coacting relation to said switch to irreversibly operate the switch upon swinging movement of said rocker by displacement of said roller away from said roller opposing means by a distance corresponding to the thickness of two or more checks therebetween, electrical circuit means interconnected between said switch and said imprinting assembly driving means for disabling the latter upon operation of said switch by said actuator, said switch including means for resetting the switch to a driving means activating position, and means including a lock encasing said switch and said resetting means thereof to make an effective unlocking of the lock an essential requisite to resetting of said switch.

6. In a check signing machine, the combination of a movable check imprinting assembly, driving means connected to said imprinting assembly for driving the latter through successive cycles of operation, check supporting means, a movable check sensing member opposing and biased toward said check supporting means, check feeding means defining a path of movement for checks extending between said check supporting means and said check sensing member to a position for signing by said imprinting assembly, a first switch actuator connected for movement by said check sensing member, a first switch mounted for operation by said first switch actuator upon movement of said check sensing member away from said check supporting means to a degree corresponding to the thickness of a single check therebetween, a check counter, electrical means connected between said first switch and said counter for rendering the latter operative only upon said operation of said switch by said first switch actuator, a counter switch connected with said counter for operating the latter, means associated with said imprinting assembly for actuating said counter switch once during each cycle of operation of the imprinting assembly, a second switch actuator connected for movement by said check sensing member, a second switch mounted for operation by said second switch actuator by movement of said check sensing member away from said check supporting means to a degree corresponding to the thickness of two checks therebetween, electrical means interconnected between said second switch and said imprinting assembly drive for immediately interrupting operation of the latter upon actuation of the second switch, said second switch including means for resetting the second switch to drive activating position after operation of the second switch by said second switch actuator, and means including a lock coacting with said second switch to preclude resetting thereof while the lock is in locked position.

7. In a check imprinting machine, the combination of a movable check imprinting assembly, a drive connected to said imprinting assembly for driving the latter through successive operating cycles, support means, a movable check sensing member opposing said support means and biased toward engagement therewith, check feeding means for directing checks between said support means and said checks sensing member to a position for imprinting by said imprinting assembly, a disabling switch, an actuator for said disabling switch connected to said check sensing member for irreversibly operating the switch upon movement of said check sensing member away from said support means to a degree corresponding to the thickness of more than one check therebetween, circuit means connected between said switch and said imprinting assembly drive to terminate operation of the latter upon actuation of said switch by said switch actuator, key operated restoring means for resetting said switch after operation thereof by said actuator, and locked casing means for preventing resetting of said switch except by means of said key operated restoring means.

8. A check signing machine comprising, in combination, platen means, a rotary imprinting assembly opposing said platen means, driving means connected to said rotary assembly, means for feeding checks between said imprinting assembly and said platen means, a flexible check ejector connected to said rotary imprinting assembly and extending in cantilever fashion radially and rearwardly from the axis thereof with respect to the direction of rotary movement thereof, and the outer extremity of said ejector extending radially beyond printing portions of said assembly when said ejector is in unflexed condition, said ejector being flexed radially inwardly upon rotation of said assembly into imprinting relation with a check on said platen means immediately to eject the check from printing position after rotation of the imprinting assembly out of imprinting relation to said platen means.

9. In a check signing machine, the combination of platen means, a rotary imprinting assembly including an imprinting member mounted for rotation across said platen means, means for feeding checks individually between said platen means and said imprinting assembly, driving means connected to rotate said imprinting assembly, a flexible check ejector mounted on said rotary assembly and extending radially outward therefrom in cantilever fashion in a direction having a rearward rake with respect to the normal direction of rotary movement of the assembly, and a nonskid friction element on the outer end of said ejector, said ejector when in unflexed condition having an effective length sufficient to support the free end of said friction element radially beyond the circumferential orbit of the imprinting portion of said imprinting member so that said ejector is flexed radially inward upon rotation of the adjacent circumferential portion of said imprinting assembly into engagement with a check supported by said platen means later to eject the check from printing position after it is cleared by the imprinting member.

10. A check signing machine comprising, in combination, platen means, a rotary imprinting assembly opposing said platen means, driving means connected to said rotary imprinting assembly, means for feeding checks between said platen and said imprinting assembly through a definite path, roller opposing means on one side of said path, a roller on the opposite side of said path, a rocker supporting said roller for movement into and out of engagement with said opposing means, an eccentric mount for said rocker spaced from the center of said roller, a switch actuator connected for operation by said rocker upon movement thereof, a switch mounted for operation by said actuator upon movement of said rocker to a degree corresponding to displacement of said roller from said opposing means therefor by the thickness of at least two checks, electrical means interconnected between said switch and said imprinting assembly drive for terminating operation of the latter upon operation of the switch, actuating means coacting with said printing assembly and with said eccentric rocker mount for shifting the latter to displace the rocker and said roller away from said roller opposing means as the printing assembly nears the end of each cycle of movement, and a check ejector connected for operation in timed relation to said printing assembly for ejecting checks from the machine after signing thereof.

11. In a check signing machine, the combination of a rotary check imprinting assembly including a signature sector and a date printing assembly projecting radially from the rotary axis thereof, said dating assembly including a barrel shaped assembly of printing rollers on the outer end thereof journaled for adjustment about an axis perpendicular to the rotary axis of the dating assembly, the periphery of each of said dating rollers at the outer end of said dating assembly substantially coinciding with a circle concentric with the axis of the dating assembly, spring pawl and detent means connected with each of said rollers for yieldably retaining the latter in various adjusted positions, rotary driving means connected to said imprinting assembly, means for feeding checks through a predetermined path into position to be signed and dated by said imprinting assembly, a roller adjacent one side of said path, roller opposing means mounted on the other side of said path in alignment with said roller, rocker means supporting said roller mounted for swinging the roller into and out of engagement with said roller opposing means about an axis spaced from the center of the roller, a switch actuator connected for movement by said rocker means, a switch mounted in association with said switch actuator for operation thereby upon swinging movement of said rocker means by displacement of said roller away from said roller opposing means by a distance corresponding to the thickness of two or more checks therebetween, and electrical circuit means interconnected between said switch and said imprinting assembly driving means for terminating operation of the latter upon actuation of said switch.

12. A check signing machine comprising in combination, platen means, a rotary imprinting assembly opposing said platen means, driving means connected to said rotary imprinting assembly, means for feeding checks between said platen and said imprinting assembly through a definite path, said check feeding means including a rotary check feed wheel, a swingable idler arm carrying a roller biased toward engagement with said check feed wheel, a cam follower on said idler arm, a circular cam on said imprinting assembly coacting with said cam follower for causing movement of said roller into and out of operative relation with said check feed wheel in timed relation to rotary movement of said imprinting assembly, roller opposing means on one side of said path, a second roller on the opposite side of said path, a rocker supporting said second roller for movement into and out of engagement with said opposing means, an eccentric mount for said rocker spaced from the center of said second roller, a switch actuator connected for operation by said rocker upon movement thereof, a switch mounted for operation by said actuator upon movement of said rocker to a degree corresponding to displacement of said second roller from said opposing means therefor by the thickness of at least two checks, electrical means interconnected between said switch and said imprinting assembly drive for terminating operation of the latter upon operation of the switch, and actuating means coacting with said imprinting assembly and said eccentric rocker mount for shifting the latter to displace the rocker and said roller thereon away from said roller opposing means as the imprinting assembly nears the end of each cycle of movement.

13. In a machine for imprinting and scarifying a drawer's signature on a check, the combination of a rotary logotype of a facsimile of a drawer's signature, a rotary platen mounted for cooperation with the logotype, an electric motor connected for rotating said logotype to draw a check between the latter and said platen for imprinting a signature on the check, a control circuit for said motor including a switch therein for disabling the motor, check sensing means mounted in the immediate vicinity of said logotype and said platen to respond positionally to the number of checks moving simultaneously between said logotype and said platen, a switch actuator connected between said check sensing means and said switch for irreversibly operating the latter to disable said motor as an incident to displacement of said check sensing means in response to movement of at least two checks simultaneously between said logotype and said platen, said switch including means for resetting the switch to motor activating position after operation of the switch by said actuator, means including locking means coacting with said switch to preclude resetting of the switch to motor activating position while the locking means is in locking position, an electric check counter including a circuit for actuating the counter, a second switch interposed in said counter circuit, switch actuating means connected between said check sensing means and said second switch to close the latter as an incident to displacement of said sensing means by movement of at least one check between said logotype and said platen, a third switch connected into said counter circuit in series with said second switch, and switch actuating means interconnected with said rotary logotype and positioned to close said third switch once during each rotary cycle of the logotype.

14. In a machine for imprinting and scarifying a drawer's signature on a check, the combination of a rotary logotype of a facsimile of a drawer's signature, a rotary platen mounted for cooperation with the logotype, an electric motor connected for rotating said logotype to draw a check between the latter and said platen for imprinting a signature on the check, a control circuit for said motor including a switch therein for disabling the motor, check sensing means mounted in the immediate vicinity of said logotype and said platen to respond positionally to the number of checks moving simultaneously between said logotype and said platen, a switch actuator connected between said check sensing means and said switch for actuating the latter to disable said motor as an incident to displacement of said check sensing means in response to movement of at least two checks simultaneously between said logotype and said platen, said switch including means for resetting the switch to motor activating position after actuation of the switch by said actuator, means including a lock coacting with said switch to preclude resetting the switch while the lock is in locked position, an electric check counter including a circuit for actuating the counter, a switch interposed in said counter circuit, and switch actuating means connected between said check sensing means and said last mentioned switch to operate the latter as an incident to displacement of said sensing means upon movement of at least one check between said logotype and said platen.

15. In a machine for imprinting and scarifying a drawer's signature on a check, the combination of a rotary logotype of a facsimile of a drawer's signature, a rotary platen mounted for cooperation with the logotype, an electric motor connected for rotating said logotype whereby a check may be drawn by the latter between said logotype and said platen for imprinting the signature on the check, a control circuit for said motor including a motor disabling switch therein, a movable check sensing member mounted to respond positionally to the movement of two or more checks simultaneously between said logotype and said platen, a switch actuator connected with said check sensing member for irreversibly actuating said switch to disable said motor as an incident to displacement of said check sensing member by at least two checks moving simultaneously between said logotype and said platen, said switch including means for resetting the switch to a motor activating position, and means including a key-controlled lock coacting with said switch and said resetting means thereof to preclude resetting of said switch while the lock is in locked position.

16. In a check imprinting machine, the combination of a movable check imprinting assembly, a drive connected to said imprinting assembly for driving the latter through successive operating cycles, support means, a movable check sensing member opposing said support means and biased toward engagement therewith, check feeding means for directing checks between said support means and said check sensing member to a position for imprinting by said imprinting assembly, disabling means coacting with said imprinting assembly drive and having first and second positions in which the disabling means respectively activates and disables said drive, an actuator for said disabling means connected to said check sensing member for irreversibly moving the disabling means from said first position to said second position as an incident to movement of said check sensing member away from said support means to a degree corresponding to the thickness of more than one check therebetween, said disabling means including restoring means for resetting the disabling means from said second position to said first position, and means including a releasable lock coacting with said disabling means to preclude operation of said restoring means to reset said disabling means to said first position while said lock remains in locked position.

References Cited in the file of this patent

UNITED STATES PATENTS

| | | | |
|---|---|---|---|
| 373,397 | Guest | Nov. 15, | 1887 |
| 1,311,849 | Snapp | July 29, | 1919 |
| 1,548,699 | Zahn | Aug. 4, | 1925 |
| 1,797,973 | Bohrer | Mar. 24, | 1931 |
| 1,916,985 | Ogsbury | July 4, | 1933 |
| 1,943,607 | Hedman | Jan. 16, | 1934 |
| 2,004,835 | Schneider | June 11, | 1935 |
| 2,071,139 | Payne | Feb. 16, | 1937 |
| 2,342,190 | Gollwitzer | Feb. 22, | 1944 |
| 2,380,331 | Ryan | July 10, | 1945 |
| 2,636,680 | Summers | Apr. 28, | 1953 |